United States Patent
Hennings et al.

(10) Patent No.: US 10,830,690 B2
(45) Date of Patent: Nov. 10, 2020

(54) METHOD FOR PRODUCING A SENSOR CAP WITH A MEMBRANE

(71) Applicant: Endress+Hauser Conducta GmbH+Co. KG, Gerlingen (DE)

(72) Inventors: Erik Hennings, Freiberg (DE); Jens Vettermann, Großweitzschen (DE); Andreas Löbbert, Waldheim (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 524 days.

(21) Appl. No.: 15/615,007

(22) Filed: Jun. 6, 2017

(65) Prior Publication Data
US 2017/0356839 A1 Dec. 14, 2017

(30) Foreign Application Priority Data
Jun. 10, 2016 (DE) .......... 10 2016 110 696

(51) Int. Cl.
*G01N 21/01* (2006.01)
*G01N 27/31* (2006.01)
*G01N 27/26* (2006.01)

(52) U.S. Cl.
CPC ............. *G01N 21/01* (2013.01); *G01N 27/26* (2013.01); *G01N 27/31* (2013.01)

(58) Field of Classification Search
CPC ........ G01N 21/01; G01N 27/31; G01N 27/26; G01N 21/75; G01N 21/64
See application file for complete search history.

(56) References Cited

U.S. PATENT DOCUMENTS

| 2,770,842 A | * | 11/1956 | Hahn | ................ B29C 45/0001 |
| | | | | 264/328.16 |
| 2,913,386 A | | 11/1959 | Clark, Jr. | |
| 5,563,109 A | * | 10/1996 | Risse | .................. C25B 11/035 |
| | | | | 427/124 |

(Continued)

FOREIGN PATENT DOCUMENTS

| CN | 1798972 A | 7/2006 |
| CN | 102590532 A | 7/2012 |

(Continued)

OTHER PUBLICATIONS

Search Report for German Patent Application No. 10 2016 110 696.8, German Patent Office, dated Mar. 8, 2017, 7 pp.

*Primary Examiner* — J. Christopher Ball
(74) *Attorney, Agent, or Firm* — Kelly J. Smith; Endress+Hauser (USA) Holding Inc.

(57) ABSTRACT

The present disclosure relates to a method for manufacturing a sensor cap with at least one main body and a membrane for an optochemical or electrochemical sensor for determining and/or monitoring the concentration of an analyte in a measuring medium, a corresponding sensor cap, and a corresponding sensor. In one aspect of the present disclosure, a permeable membrane is provided with a surface for contacting the measuring medium, as well as a main body with at least one sector for connecting to the membrane. At least part of the membrane and main body are welded, wherein the membrane is at least partially applied to the at least one sector of the main body and a connection between the main body and membrane is sealed against the measuring medium.

17 Claims, 4 Drawing Sheets

(56) References Cited

U.S. PATENT DOCUMENTS

| | | | |
|---|---|---|---|
| 2013/0161191 A1 | 6/2013 | Wilhelm et al. | |
| 2013/0270125 A1* | 10/2013 | Lobbert | G01N 27/4163 |
| | | | 205/793 |
| 2015/0008141 A1 | 1/2015 | Ocvirk et al. | |
| 2015/0068898 A1* | 3/2015 | Fanselow | G01N 27/40 |
| | | | 204/415 |
| 2015/0230742 A1 | 8/2015 | Silver | |

FOREIGN PATENT DOCUMENTS

| | | | |
|---|---|---|---|
| CN | 103376285 A | 4/2013 | |
| CN | 103364375 A | 10/2013 | |
| CN | 104458678 A | 3/2015 | |
| DE | 1648551 A1 | 2/1972 | |
| DE | 4025635 A1 | 2/1991 | |
| DE | 4407328 B4 | 9/1994 | |
| DE | 19602861 C2 | 7/1997 | |
| DE | 19610192 A1 * | 11/1997 | G01N 27/404 |
| DE | 19610192 C2 | 11/1997 | |
| DE | 19936063 A1 | 2/2001 | |
| DE | 10051220 A1 | 4/2002 | |
| DE | 102010063033 B4 | 6/2012 | |
| DE | 102013013601 A1 | 3/2015 | |
| DE | 102014112972 A1 * | 3/2015 | G01N 27/40 |
| EP | 1866634 B1 | 12/2007 | |
| GB | 2235050 A * | 2/1991 | G01N 27/4045 |

* cited by examiner

METHOD FOR PRODUCING A SENSOR CAP WITH A MEMBRANE

CROSS-REFERENCE TO RELATED APPLICATION

The present application is related to and claims the priority benefit of German Patent Application No. 10 2016 110 696.8, filed Jun. 10, 2016, the entire contents of which are incorporated herein by reference.

TECHNICAL FIELD

The present disclosure relates to a method for producing a sensor cap with at least one main body and a membrane for an optochemical or electrochemical sensor for determining the concentration of an analyte in a gaseous or liquid measuring medium, or of a measurand that depends upon the concentration of the analyte in the measuring medium. Moreover, the present disclosure relates to a sensor cap produced by a method according to the present disclosure, as well as a sensor with a corresponding sensor cap. In the following, an analyte is to be understood as any form of ions or gases contained in a liquid or a gas/gaseous mixture.

BACKGROUND

Optochemical and electrochemical sensors frequently include a membrane that is brought into contact with a measuring medium, e.g., a measuring gas or a measuring liquid, in order to capture measured values during ongoing measurement. Depending upon whether the sensor is an optochemical or electrochemical sensor, the membrane has a different function and is designed especially for its use. In the case of optochemical sensors, the membrane is, for example, frequently a thin film that is constructed from one or more superimposed layers, for example, polymer layers. The individual layers have different properties which are needed for the functioning of the respective sensor; specifically, one of the sensor-specific layers, specifically functional layers, is designed to be at least partially permeable to the measuring medium and/or to an analyte contained in the measuring medium. With electrochemical sensors, the membrane is, contrastingly, often a porous layer, specifically a layer that has pores or openings, which is partially permeable to the measuring medium or at least an analyte contained therein.

Many electrochemical, especially amperometric, sensors have an electrolyte chamber separated from the measuring medium by means of the membrane. The membrane in amperometric sensors for determining a gas concentration in a liquid, e.g., electrochemical $O_2$, $Cl_2$, $CO_2$, $H_2S$, $NH_3$ or $SO_2$ sensors, serves as a diffusion barrier that allows the analyte to diffuse from the measuring medium into the electrolyte chamber. Such a sensor is described in, for example, DE 10 2008 039465 A1.

Optochemical sensors, e.g., optochemical oxygen, ozone or carbon dioxide sensors, are frequently based upon an analyte-induced quenching of the fluorescence or luminescence of an organic dye or a so-called fluorophore. This fluorophore is normally contained, commonly dissolved, in a functional layer, which membrane is in turn applied to a substrate such as a glass layer or an optical fiber in order to form a sensor spot. Upon contacting the respective measuring medium, the fluorescence and/or luminescence intensity of the fluorophore as a function of the analyte concentration in the measuring medium decreases, due to the interaction of the fluorophore with the analyte. Different embodiments of optochemical sensors are, for example, known from the documents WO2005/100957A1 and DE10051220A1.

A measuring membrane that is suitable for an optochemical or electrochemical sensor is, for example, known from DE102014112972A1. The measuring membrane comprises a sensor element that features at least one functional layer with a sensor-specific substance and a substrate material, wherein the sensor element is fully embedded in a matrix, and wherein the matrix consists of a material that is accessible to the analyte in at least a sector facing the medium and adjacent to the sensor element.

In many cases, the membrane is part of a sensor cap that has an especially cylindrically-shaped main body to which the membrane is glued, or frequently also clamped, on the face side in an end region. However, with such attachment methods, leaks in the region of the sensor cap frequently occur during ongoing operation of the respective sensor, especially over time. With a glued membrane, the glue can, for example, be attacked and at least partially dissolved by the respective analyte, such as chlorine or chlorine oxide. With clamped membranes, wrinkles can arise at the edges, and/or the membrane can be destroyed by the clamping.

SUMMARY

The aim of the present disclosure is therefore to provide a particularly long-lasting and robust sensor cap for an optochemical or electrochemical sensor.

With regard to the method, the aim of the present disclosure is achieved by a method for producing a sensor cap with at least one main body and a membrane for an optochemical or electrochemical sensor for determining and/or monitoring the concentration of an analyte in a measuring medium, comprising the following method steps: providing a membrane that is permeable to the measuring medium, and/or to at least one analyte contained in the measuring medium, with a surface for contacting the measuring medium; providing a main body with at least one sector for connecting to the membrane; and welding at least a part of the membrane and main body, wherein the membrane is at least partially applied to the at least one sector of the main body, and a connection between the main body and membrane is produced that is sealed against the measuring medium.

A wide variety of membrane embodiments are possible which can each be adapted to the intended application, for example, to the respective analyte, or for a specific sensor concept. In one embodiment, the membrane is at least partially designed in the form of a porous structure, including a structure that has pores. Alternatively, the membrane can also be at least partially designed as a thin film which is constructed from one or more superimposed layers, such as functional layers, which layers can at least partially have the same or differently dimensioned main surfaces, wherein at least one layer is provided for welding the membrane to the main body, and/or wherein the layer provided for welding is designed such that it at least partially runs along an end face of the main body facing the measuring medium, or along the end face and at least partially along at least one lateral surface of the main body facing the measuring medium, or runs extending almost entirely into, or extending sufficiently into, an inner region of the main body along a surface of the main body facing the measuring medium.

For electrochemical sensors, the membrane is designed at least partially as a porous structure, including a structure having pores. It can, for example, be produced at least partially from at least one polymer. The geometric dimensions are adapted to the geometry of the main body of the sensor cap, or to the respective sensor. Frequently, the membrane has a substantially circular main surface.

With an optochemical sensor, the membrane is, by contrast, a thin film which comprises one or more superimposed layers, including functional layers. One layer has a selective permeability to the analyte, at least partially, whereas other layers ensure the chemical and mechanical stability of the membrane, or can be such that they fluoresce, phosphoresce, or also absorb light upon being correspondingly excited. At least one layer is, moreover, provided for welding. This can be the layer that has the surface provided for contacting the measuring medium. The main surfaces of the layer/layers forming the sensor spot and the layer provided for welding can, in principle, be dimensioned differently, specifically, the layer provided for welding can have a larger main surface than the other layers. In this case, the membrane is, for example, welded to a surface that, in particular, not only borders a face end of the main body but also at least partially borders a lateral surface of the main body. At least the layer provided for welding can completely cover the main body on the surface facing the measuring medium.

The layer/layers forming the sensor spot can be applied separately to the main body, wherein the layer provided for welding is welded over the sensor spot to the main body. Only part of the membrane is welded to the main body. Alternatively, however, the layers forming the sensor spot can also first be applied to the layer provided for welding which is subsequently welded to the main body. In any event, the membrane is to be understood in the following as all of the layers.

Through joining the membrane and the main body by welding, an integral, long-lasting connection is achieved between the membrane and the main body. The result is a substantially monobloc sensor cap which is sealed against the measuring medium and/or, if applicable, an electrolyte, which is particularly advantageous for applications with stringent hygienic requirements. The method according to the present disclosure, moreover, enables a simple and reliable production process. In addition to the main body and the membrane, no other elements, such as sealing rings, etc., are necessary, as with a clamped membrane.

Welding methods without the use of filler metals are particularly preferable. With regard to their mechanical and chemical properties, the materials for the membrane and the main body can be optimally adapted to the intended application of the respective sensor. They are, therefore, normally chemically resistant to the analyte. If they are directly connected to each other, the chemical resistance of the sensor cap remains comparable to the chemical resistance of the main body and the membrane. If, in contrast, an additional material is needed for creating an integral bond, as in the case of adhesion or many welding methods, this material must be carefully selected, or the best compromise must be found with regard to differing, sometimes contrary, requirements, e.g., as to adhesive properties or chemical resistance. This can, disadvantageously, result in the material's chemical stability with respect to the measuring medium being less than that of the main body and the membrane.

According to the present disclosure, the membrane is at least partially applied to at least a sector of the main body. This at least one sector can, for example, be a section or portion of at least one surface of the main body. The at least one sector can be flat or curved. Moreover, the wall of the main body can be specifically incorporated, e.g., structured, into the at least one sector.

In one embodiment of the method according to the present disclosure, the main body is designed so that it has at least one end-face opening delimited by a wall of the main body, wherein the at least one sector is established by the wall of the main body in the region of the opening, and/or wherein the main body is made of a translucent or transparent material at least in the at least one sector. The first version is particularly suitable for an electrochemical, including an amperometric, sensor, whereas the second version is preferably used for optochemical sensors.

In the event of a cylindrical main body, the sector can, for example, be established by one of the two circular, flat surface regions of the cylinder. In the event that the cylinder is open at at least one of the two opposing ends with a circular area, the sector can be established by the boundary of one of these two openings in the wall of the main body.

To produce the integral connection, the membrane and the main body are then welded to each other. Particularly, the membrane is welded to or on the at least one sector of the main body. This membrane preferably at least partially or completely covers the sector and/or entirely closes an opening in the main body in the event that the sector represents the boundary of an opening in the wall of the main body.

In another embodiment of the method, the geometry and/or material of the main body is selected so that at least one hygiene standard is met. Reference is made to the conventional standards for hygienic applications such as ASME, BPE, 3A, or EHEDG. In the event of applications associated with milk products, the selected materials for producing the respective sensors must, for example, be stable against fat residues at high temperatures. Particularly, the cleanability test, sterilization tests, and bacteria-proof tests stipulated and certified by the EHEDG (EL class 1, EL aseptic, EL class 2, or ED) are relevant in this context. Additional conventional requirements or permits in this context relate to, for example, ASME-BPE (cleanability after treatment at 130° C., 100 h) ASME, BPE, and harmlessness, pursuant to FDA, USP Class VI (87/88/381).

If plastics are used, care should especially be taken that the employed materials possess minimum roughness. In this regard, it is advantageous for the main body to be made as a monobloc component, for example, as an injection-molded part, and/or for the main body to be produced from a material with a roughness of less than 0.8 µm, or for at least one surface of the main body to be provided with a coating, which coating has a roughness of less than 0.8 µm. The threshold of surface roughness of 0.8 µm applies to hygienic applications. For aseptic applications, the specifiable threshold of the roughness is preferably about 0.38 µm.

In another embodiment of the method, the membrane and/or the main body is/are at least partially produced from a plastic, for example, a fluoroplastic such as polytetrafluoroethylene (PTFE) or polyvinylidene fluoride (PVDF). The plastic can be adapted to a specific application of the sensor, and, especially, optimized with regard to its chemical resistance, etc.

It is advantageous when the main body and membrane are at least partially produced from the same material. Using the same material for the main body and membrane simplifies the welding method to be used, since, for example, no problems such as those that are production-related are anticipated, e.g., with respect to the compatibility of the two components, for example, with regard to the creation of a weld especially with regard to the respective melting temperatures and/or chemical compatibility.

In one embodiment of the method, the main body and membrane are welded to each other in an ultrasonic joining method, such as by ultrasonic welding. Ultrasonic welding is a so-called friction welding method, in which at least local heating by molecular and surface friction arises from high-frequency mechanical vibration between the components to be welded. In the case of metals, this brings about an engagement and interlocking of the components, whereas, in the case of thermoplastic plastics, a softening or local heating of the components is achieved. Bearing in mind that welding describes the inseparable connection of components using heat, based upon heating the components, by means of ultrasound in the case of ultrasound-based joining methods, various versions of the known ultrasound-based joining methods are understood to be variations of a welding method, for example, ultrasonic hot stamping, ultrasonic thermoforming, ultrasonic riveting, or ultrasonic punching. In this regard, mention is made of the article by J. Sackmann et al., Review of ultrasonic fabrication of polymer micro devices, Ultrasonics (2014), doi: http://dx.doi.org.10.1016/j.ultras.2014.08.007, which is hereby referenced in its entirety.

According to another embodiment of the method, at least one additional functional layer is applied to a surface of the membrane, including by means of a coating method such as the so-called chemical vapor deposition (CVD) or physical vapor deposition (PVD) method. This additional functional layer can, for example, be applied to the surface which is provided for contacting the medium, and/or to the surface of the membrane facing away from the medium, and can be specifically adapted to the intended use of the sensor. In the case of an optochemical sensor, a darkening layer, for example, can be applied to the surface provided for contacting with a measuring medium. Also, with regard to requirements from conventional standards for hygiene requirements such as ASME, BPE, 3A, or EHEDG, an additional layer on the surface of the membrane facing away from the measuring medium can be advantageous.

The aim according to the present disclosure is further achieved with a sensor cap having at least one main body and a membrane, for example, for an electrochemical or optochemical sensor, which sensor cap is produced according to an embodiment of the method according to the present disclosure.

A further embodiment of the sensor according to the present disclosure entails that the main body be substantially cylindrical, cuboid, tapered, frustoconical, conical, hemispherical, angled-cylindrical, concave or convex, at least in part.

According to another embodiment, the membrane at least partially has a flat, conical, pyramidal or ellipsoid geometry.

Such geometric considerations with respect to the main body and/or the membrane are advantageous for various reasons. Accordingly, the sensor can, for example, be optimized with regard to the flow behavior of the respective measuring medium in the respective application, and/or with regard to special hygiene requirements. By a suitable choice of the geometry, a potential collection of bubbles in the region of the sensitive membrane can also be prevented.

It is advantageous for at least one section, such as an edge region of the membrane and/or at least a part of the sector of the main body, to be designed to be substantially flat, and/or wherein at least the section of the membrane and/or the part of the sector of the main body have, at least partially, a structured surface. The welded connection is then made along the flat sections of the membrane and at least the sector of the main body. The structured sections, especially the structures which are also termed concentrators, melt locally during the welding process.

A particularly embodiment of a sensor cap entails that a line parallel to the sector of the main body and a longitudinal axis of the main body form an angle with each other which is other than 90°. This embodiment is substantially a front-flush, beveled sensor cap.

The aim of the present disclosure is, finally, also achieved by a sensor, for example, an electrochemical or optochemical sensor for determining and/or monitoring the concentration of an analyte in a measuring medium, with a sensor cap according to the present disclosure.

It should be noted that the embodiments of the method according to the present disclosure are also applicable, mutatis mutandis, to the sensor cap according to the present disclosure and the sensor according to the present disclosure, and vice versa.

BRIEF DESCRIPTION OF THE DRAWINGS

Below the present disclosure is explained in further detail on the basis of exemplary embodiments shown in the figures:

FIGS. 4A-4E show various embodiments of a membrane cap according to the present disclosure.

DETAILED DESCRIPTION

Figure 1A:
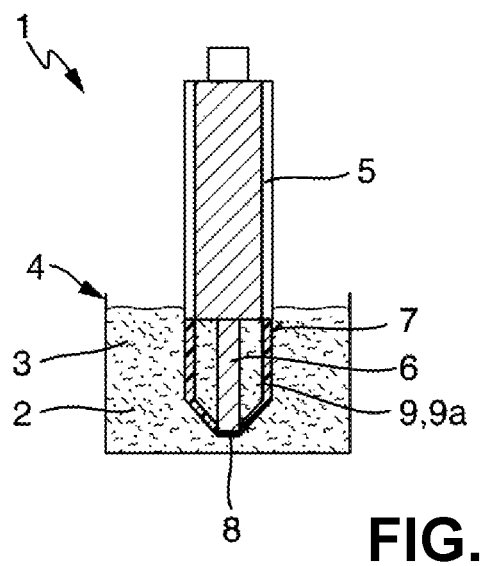
FIG. 1A shows a schematic of an electrochemical sensor according to the present disclosure.

FIG. 1A shows a schematic representation of an electrochemical sensor 1 for determining and/or monitoring the concentration of an analyte 2 in a gaseous or liquid measuring medium 3 in a container 4. The sensor comprises a sensor tube 5 within which a measuring electrode 6 is arranged, and on which a membrane cap 7 with a membrane 8 is arranged on the side facing the medium. The measuring electrode 6 extends into an electrolyte chamber 9, which is filled with an electrolyte 9a and terminates at the medium side with the membrane 8, and contacts the membrane 8, at least in a sector. This contact can cause the membrane 8 to curve slightly. A similar design of an electrochemical sensor is, for example, disclosed in the document U.S. Pat. No. 2,913,386.

Figure 1B:
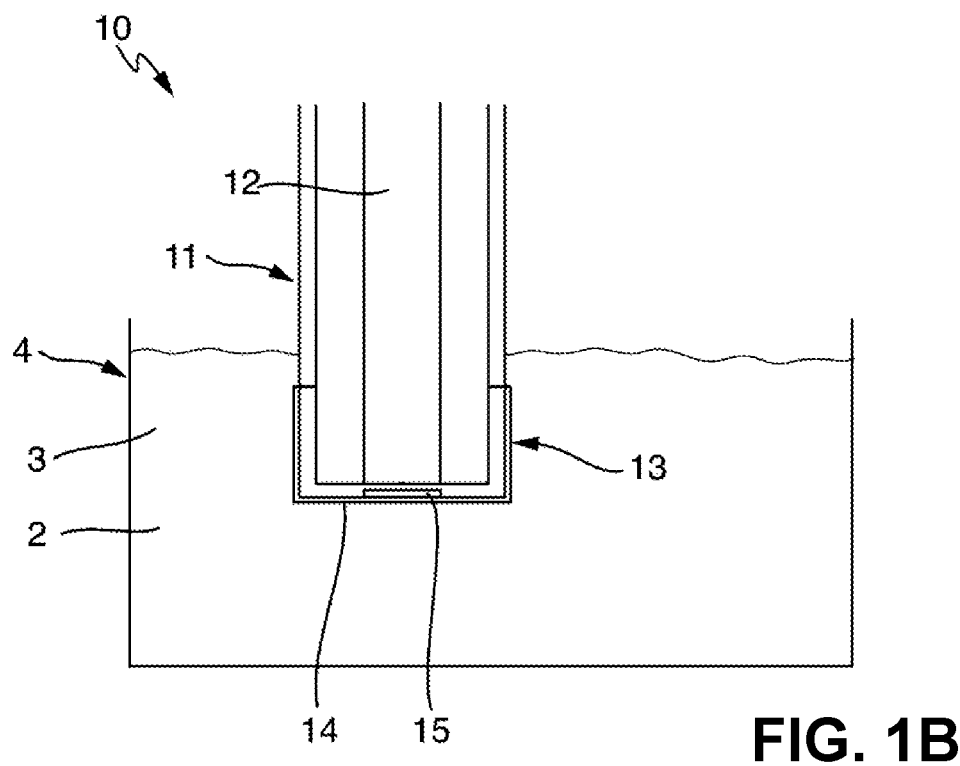
FIG. 1B shows a partial schematic of an optochemical sensor according to the present disclosure.

On the other hand, a schematic representation of an optochemical sensor 10 for determining and/or monitoring the concentration of an analyte 2 in a gaseous or liquid measuring medium 3 in a container 4 is shown in FIG. 1B. The sensor 10 comprises a sensor tube 11 with an optical wave guide 12. On the side of the sensor tube 11 facing the measuring medium 3, the sensor tube 11 terminates with a membrane 14 which is arranged front-flush against a membrane cap 13 with a sensor spot 15.

Figure 2A:
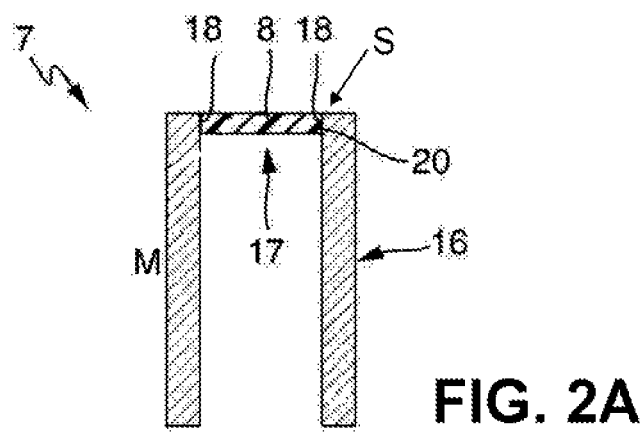
FIG. 2A shows a schematic of a sensor cap for an electrochemical sensor according to an embodiment of the present disclosure.

FIG. 2A shows an example of a cylindrical sensor cap 7, frequently also termed a membrane cap, which is especially suitable for an electrochemical sensor. The sensor cap 7 comprises a cylindrically-shaped main body 16 in this region, which, in the region facing the measuring medium 3, has an opening 17 defined by its wall in the region of the end face S. A sector 18 to be welded is established in this case by the wall of the main body 16 in the region of the opening 17. The membrane 8, here in the form of a porous structure, can be enclosed in the opening 17 as shown in FIG. 2A. However, it is, for example, also possible to apply the membrane 8 to the end face S of the main body 16.

Figure 2B:
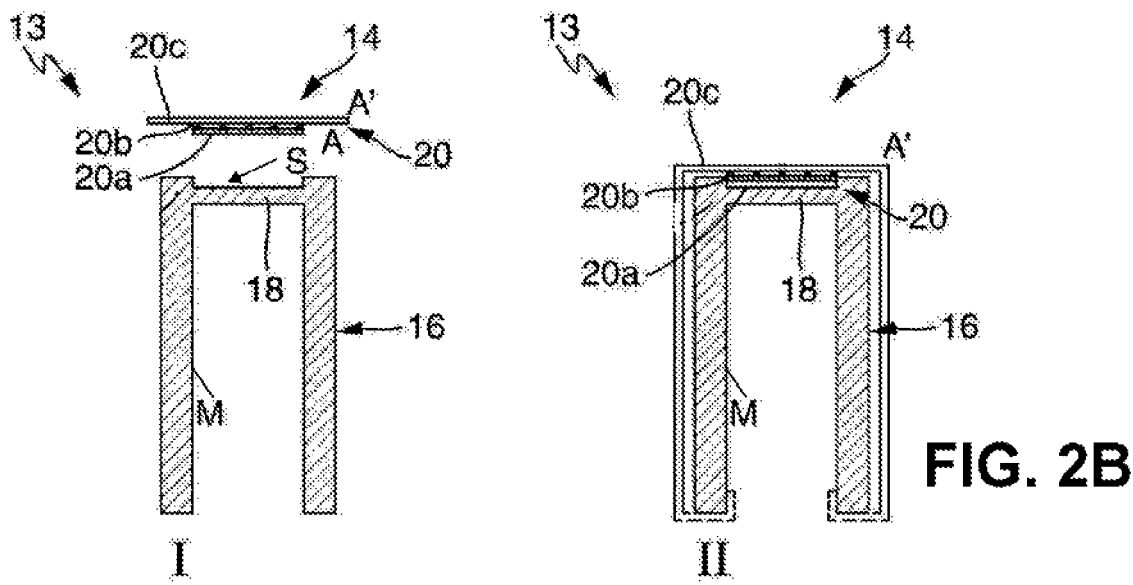
FIG. 2B shows a schematic of a sensor cap for an optochemical sensor according to an embodiment of the present disclosure.
Figure 2C:
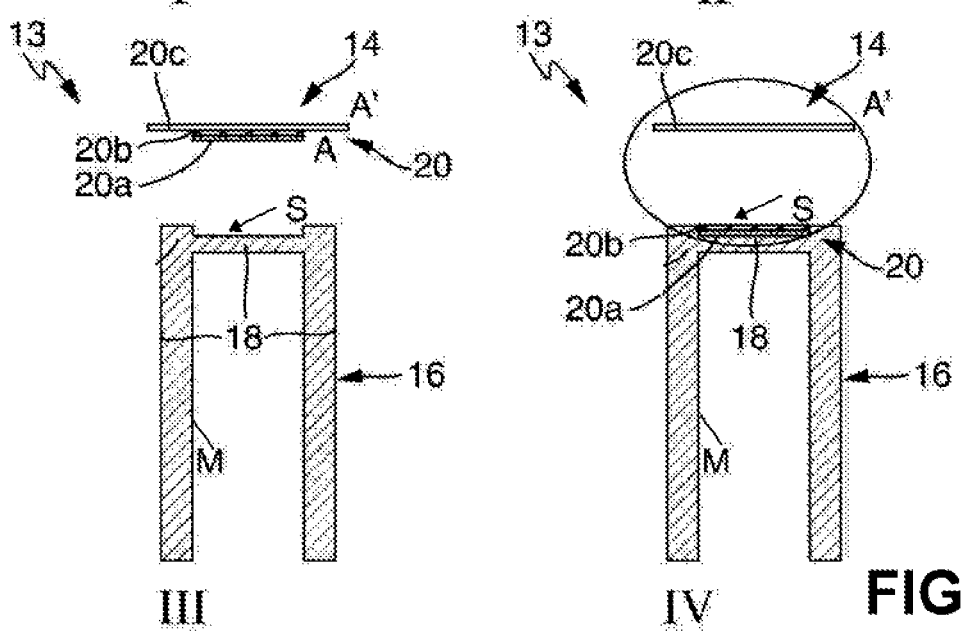
FIG. 2C shows a schematic of a sensor cap for an optochemical sensor according to an alternative embodiment of the present disclosure.

FIG. 2B and FIG. 2C show two sensor caps 13, similar to the one embodied in FIG. 2A, which are especially suitable for an optochemical sensor. Contrary to FIG. 2A, the main body 16 for an optochemical sensor does not comprise an opening 17. As shown here, although not absolutely necessary, the end face S of the main body 16 facing the measuring medium 3 comprises a suitably-dimensioned recess for accommodating the sensor spot 20. In this case, it is a front-flush membrane cap 13. The main body 16 can, for example, be made as an injection molded part from a transparent or translucent plastic, for example, PVDF. The degree of transparency can, for example, be influenced by the wall thickness or the thickness of the material.

It is noted that, in the depicted exemplary embodiments from FIG. 2B, as well as those from FIG. 2C, the membrane 14 comprises both the sensor spot 20 as well as a layer 20c. After the welding process, at least part of the layer 20c provided for welding and at least part of the sector 18 of the main body 16 provided for welding are fused with each other. It can then be at least somewhat difficult to distinguish between the main body 16 and the layer 20c provided for welding. The sensor-specific functions of the membrane 14 are performed by the other layers 20a, 20b that form the sensor spot 20 in the exemplary embodiment addressed here.

First of all, FIG. 2B shows two different embodiments I and II for the membrane 14. As is most readily discernible in FIG. 2B, in embodiment I, the membrane 14, which is designed in the form of a thin film for the membrane cap 13 suitable for an optochemical sensor, comprises a plurality of superimposed layers 20a, 20b, 20c. In this instance, the layers 20a, 20b form, for example, the optical sensor spot 20. The number and arrangement of the individual layers 20a, 20b are adapted in each case to a specific sensor or to a specific application. Of course, the membrane 14 can comprise more than the two layers 20a, 20b shown here as an example for the sake of clarity. Moreover, the membrane 14 comprises a layer 20c provided for welding that, in both depicted exemplary embodiments—which, however, is not absolutely necessary—has a larger main surface A' than the layers 20a, 20b forming the sensor spot 20, which in this case have a main surface A that is identical for both layers 20a, 20b. It should be noted that many different embodiments are conceivable for the relation between the sensor spot 20 dimensions and the layer provided for welding, which are all covered by the present disclosure. In the case of embodiment I of FIG. 2B, the layer 20c provided for welding runs at least substantially along the entire end face S of the main body 16 which faces the medium. Alternatively, as shown in embodiment II of FIG. 2B, the layer 20c can also run along the lateral surface M of the main body, i.e., substantially along the entire perimeter of the surface of the main body 16 facing the measuring medium. As shown by the extension of the layer 20c (indicated with a dashed line), the layer 20c can also run into an inner region of the main body 16. In this case, a vacuum welding method is especially recommendable for producing the sensor cap 13. The last-cited version, in which the layer 20c provided for welding surrounds the entire perimeter of the surface of the main body 16 facing the measuring medium and extends into an inner region of the main body, is a particularly advantageous embodiment of the present disclosure. The membrane cap 13 that arises in this manner, being integrally connected as a single part to the main body by welding, has a surface which is especially suitable for applications with stringent hygiene requirements. In particular, waves and/or corrugation cannot form along the surface.

Two different versions for producing a sensor cap 13 are illustrated in FIG. 2C as examples. Both versions are suitable for a wide variety of embodiments of the individual layers 20a, 20b, 20c forming the membrane 14 especially, also for embodiments I and II from FIG. 2B. All of the methods known to a person skilled in the art, such as squeegeeing, spray coating, spin coating, etc., are possible methods for producing a sensor spot 20.

According to embodiment III of FIG. 2C, the sensor spot 20 is first applied to the layer 20c provided for welding. One production version for a corresponding membrane is to apply the individual, different layers 20a, 20b, which may be polymers, individually and sequentially to the layer 20c provided for welding. One exemplary arrangement of the layers 20a, 20b comprises applying a transparent silicone layer to the layer 20c after a suitable plasma treatment of said layer, followed by an optically-isolating black layer, a silicone layer with a fluorescence indicator, and another transparent layer. However, the two transparent layers and the optically isolating layer are not, however, absolutely necessary for an optochemical sensor.

Embodiment IV from FIG. 2C is, for this purpose, an alternative embodiment. In this context, the sensor spot 20 is first applied to the main body 16. In this case, the region of the main body 16 to which the sensor spot 20 is applied first undergoes a suitable plasma treatment. Then, the layers 20a, 20b forming the sensor spot 20 are applied in a suitable sequence. A suitable sequence similar to embodiment III of FIG. 2C would, for example, be the application of a transparent layer, followed by a silicone layer with a fluorescence indicator, an optically-isolating layer, as well as another transparent layer.

With optochemical and/or electrochemical sensors, the main body 16 forming the membrane cap 7, 13 and the membrane 8, 14 are frequently produced from plastics. In this case, the use of an ultrasound-based joining method such as ultrasonic welding is particularly advantageous. The following description therefore refers to a membrane cap 7, 13 produced by means of ultrasonic welding.

Figure 3:
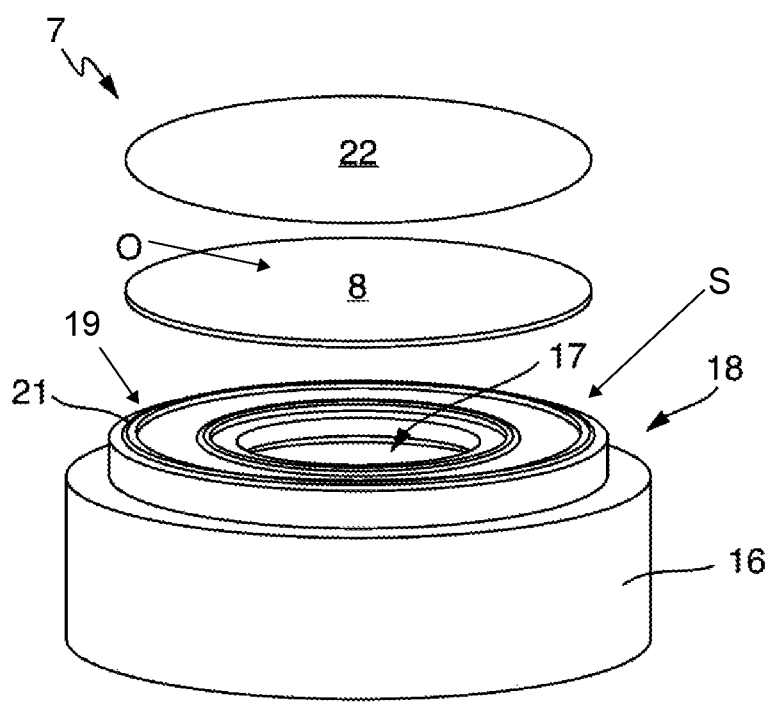
FIG. 3 shows a perspective view of a main body according to the present disclosure and a membrane for the welding process.

FIG. 3 shows a perspective view of an embodiment according to the present disclosure of a main body 16 and membrane 8 of the membrane cap 7 before the welding process. As in FIG. 2A, the main body 16 in this example has an opening 17 delimited on its end face S on the medium side by its wall. The example can be readily transferred to a membrane cap 13, which is closed on the medium side as in FIG. 2B.

The sector 18 to be welded of the main body 16 is established by the wall of the main body 16 defining the opening 17, as in FIG. 2A. In a section 19 of the sector 18, the main body has a structured surface 21. Here, so-called concentrators are incorporated in the main body 16 that melt during the welding process and provide an integral connection of the main body 16 and the membrane 8, 14.

For sensor applications with stringent hygienic requirements, an additional functional layer 22 can be applied in the region of a surface O of the membrane 8 provided for contacting the measuring medium. Alternatively, the surface O of the membrane 8, 14 facing the measuring medium can also be specifically functionalized, for example, by a plasma treatment or corona treatment.

The method according to the present disclosure makes it possible to produce a plurality of membrane caps 7, 13 with different geometries that are particularly advantageous for various uses. An exemplary selection is depicted in FIGS. 4A-4E.

FIG. 4A shows a cylindrical main body 16 which is formed concavely in the region facing the membrane 8, 14. In another embodiment, as shown in FIG. 4C, the main body 16 is also designed cylindrically; however, in the region facing the membrane 8, 14, it is designed to pyramidally taper to a point toward the membrane 8, 14.

Figure 4E:
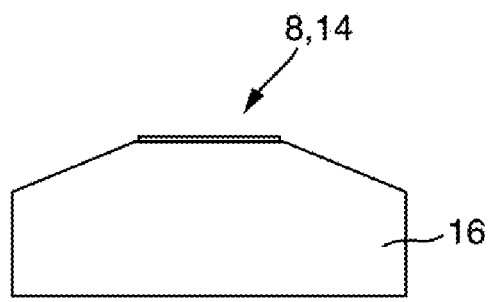
Figure 4E:
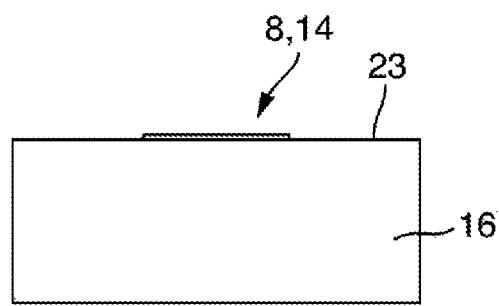
Figure 4E:
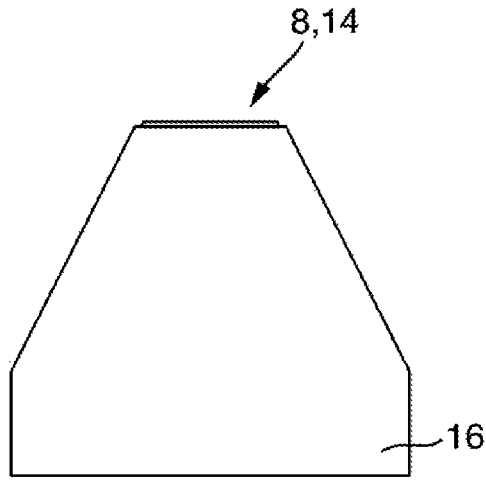
Figure 4E:
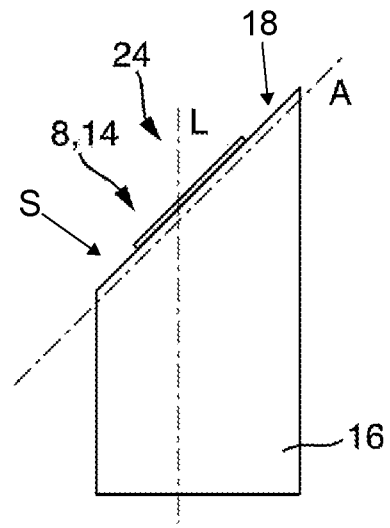
Figure 4E:
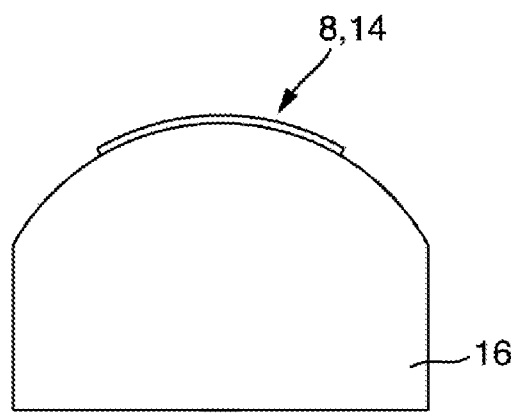

In the embodiment according to FIG. 4B, the membrane 8, 14 is applied in the middle of the main body 16. The flat, annular edge region 23 forms the sector 18 of the membrane 8, 14 provided for welding. An edge region 23 with such a design is, however, not absolutely essential. Alternatively, a cylindrical main body 16 with a camber can be used, as in the example according to FIG. 4E. In this case, the membrane 8, 14 as well is curved.

Another embodiment according to the present disclosure of a membrane cap 7, 13 is depicted in FIG. 4D. In this case, the boundary surface S of the main body 16 facing the membrane, which is, at least partially, the sector 18 provided for welding, independently of whether or not it has an opening, is designed such that the angle between a line A parallel to the sector 18 and a longitudinal axis L of the main body 16 is an angle that is other than 90°. The side 24 of the membrane cap facing the measuring medium is, accordingly, angled in this embodiment.

Naturally, it is understood that, in addition to the described examples of a membrane cap 7, 13 according to the present disclosure, many other embodiments are possible which likewise fall under the present disclosure.

The invention claimed is:

1. A method for manufacturing a sensor cap for a sensor for determining and/or monitoring the concentration of an analyte in a measuring medium, the method comprising:
   providing a membrane that is permeable to the measuring medium and/or to at least one analyte in the measuring medium, the membrane including a surface for contacting the measuring medium, wherein the membrane is arranged on a side of the sensor cap facing the measuring medium;
   providing a main body with at least one sector structured for connecting to the membrane; and
   ultrasonically welding at least a part of the membrane to the main body, wherein the membrane is at least partially joined to the at least one sector of the main body, and wherein a connection between the main body and the membrane is generated that is sealed against the measuring medium, wherein the membrane at least partially has a porous structure.

2. The method of claim 1, wherein the membrane is at least partially embodied as a thin film comprising one or more superimposed layers, including a functional layer, wherein at least one layer facilitates welding the membrane to the main body and is structured such that it at least partially extends along an end face of the main body facing the measuring medium, extends along the end face and at least partially along at least one lateral surface of the main body facing the measuring medium, or extends substantially or sufficiently into an inner region of the main body along a surface of the main body facing the measuring medium.

3. The method of claim 2, wherein at least one additional functional layer is applied to a surface of the membrane using a chemical vapor deposition or physical vapor deposition coating method.

4. The method of claim 1, wherein the main body includes at least one end-face opening defined by a wall of the main body, and/or wherein the at least one sector is defined by the wall of the main body in the region of the opening.

5. The method of claim 1, wherein the main body is made of a translucent or transparent material at least in the at least one sector.

6. The method of claim 1, wherein the main body is made as a monobloc component, and/or wherein the main body is of a material having a surface roughness of less than 0.8 micrometers or at least one surface of the main body includes a coating having a roughness less than 0.8 micrometers.

7. The method of claim 6, wherein the main body is an injection-molded, monobloc component.

8. The method of claim 1, wherein the membrane and/or the main body is/are at least partially made of a plastic.

9. The method of claim 1, wherein the membrane and/or the main body is/are at least partially made of polytetrafluoroethylene or polyvinylidene fluoride.

10. The method of claim 1, wherein the sensor is an electrochemical or optochemical sensor.

11. A method for manufacturing a sensor cap for a sensor for determining and/or monitoring the concentration of an analyte in a measuring medium, the method comprising:
    providing a membrane that is permeable to the measuring medium and/or to at least one analyte in the measuring medium, the membrane including a surface for contacting the measuring medium, wherein the membrane is arranged on a side of the sensor cap facing the measuring medium;
    providing a main body with at least one sector structured for connecting to the membrane; and
    ultrasonically welding at least a part of the membrane to the main body, wherein the membrane is at least partially joined to the at least one sector of the main body, and wherein a connection between the main body and the membrane is generated that is sealed against the measuring medium, wherein the main body and the membrane are at least partially made of the same material.

12. A sensor cap for an electrochemical or optochemical sensor, the sensor cap comprising:
    a membrane that is permeable to a desired measuring medium and/or to at least one analyte in the measuring medium, the membrane including a surface for contacting the measuring medium; and
    a main body with at least one sector structured for connecting to the membrane, wherein the membrane is arranged on a side of the sensor cap facing the measuring medium,
    wherein the membrane and the main body are at least partially ultrasonically welded together such that the membrane is at least partially joined to the at least one sector of the main body, and wherein the ultrasonic weld between the main body and the membrane is sealed against the measuring medium, wherein the membrane at least partially has a porous structure.

13. The sensor cap of claim 12, wherein the main body is substantially cylindrical, cuboid, tapered, frustoconical, conical, hemispherical, angled-cylindrical, concave or convex, at least in part.

14. The sensor cap of claim 12, wherein the membrane is at least partially flat, conical, pyramidal or ellipsoid.

15. The sensor cap of claim 12, wherein at least an edge region of the membrane and/or at least a part of the sector of the main body is substantially flat, and/or wherein at least the edge region of the membrane and/or the part of the sector of the main body have, at least partially, a structured surface.

16. The sensor cap of claim 12, wherein a line parallel to the sector of the main body and a longitudinal axis of the main body form an angle to each other that is other than 90°.

17. A sensor cap for an electrochemical or optochemical sensor, the sensor cap comprising:
- a membrane that is permeable to a desired measuring medium and/or to at least one analyte in the measuring medium, the membrane including a surface for contacting the measuring medium; and
- a main body with at least one sector structured for connecting to the membrane, wherein the membrane is arranged on a side of the sensor cap facing the measuring medium, wherein the membrane and the main body are at least partially ultrasonically welded together such that the membrane is at least partially joined to the at least one sector of the main body, and wherein the ultrasonic weld between the main body and the membrane is sealed against the measuring medium;
- wherein the membrane at least partially has a porous structure;
- wherein the main body and the membrane are at least partially made of the same material.

\* \* \* \* \*